United States Patent
Choi

(10) Patent No.: US 9,342,172 B2
(45) Date of Patent: May 17, 2016

(54) METHOD OF DETECTING PROTECTION CASE AND ELECTRONIC DEVICE THEREOF

(71) Applicant: Samsung Electronics Co., Ltd., Suwon-si, Gyeonggi-do (KR)

(72) Inventor: Jae-Joon Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 14/173,224

(22) Filed: Feb. 5, 2014

(65) Prior Publication Data

US 2014/0240253 A1 Aug. 28, 2014

(30) Foreign Application Priority Data

Feb. 28, 2013 (KR) .......................... 10-2013-0022206

(51) Int. Cl.
*G06F 3/02* (2006.01)
*G06F 3/041* (2006.01)
*G06F 3/044* (2006.01)

(52) U.S. Cl.
CPC ............... *G06F 3/041* (2013.01); *G06F 3/044* (2013.01)

(58) Field of Classification Search
CPC ....... G06F 3/041; G06F 3/044; G06F 1/1626; G06F 1/1643; G06F 3/0202; G06F 3/04886; G06F 2200/1634; G06F 2203/04809
USPC ............... 455/90.3, 571; 361/679.01–679.61; 345/156, 168–179; 178/18.01–18.09; 715/702, 764, 773, 863–864
See application file for complete search history.

(56) References Cited

U.S. PATENT DOCUMENTS

| | | | |
|---|---|---|---|
| 2002/0071550 A1 | 6/2002 | Pletikosa | |
| 2006/0211458 A1 | 9/2006 | Pletikosa | |
| 2007/0135184 A1 | 6/2007 | Pletikosa | |
| 2010/0238119 A1* | 9/2010 | Dubrovsky et al. | 345/169 |
| 2010/0315348 A1* | 12/2010 | Jellicoe et al. | 345/173 |
| 2011/0157037 A1* | 6/2011 | Shamir et al. | 345/173 |
| 2012/0039023 A1* | 2/2012 | Renwick | 361/679.01 |
| 2014/0304806 A1* | 10/2014 | Koo | 726/16 |
| 2015/0035771 A1* | 2/2015 | Park | G06F 3/0412 345/173 |
| 2015/0105128 A1* | 4/2015 | Huang et al. | 455/575.8 |

FOREIGN PATENT DOCUMENTS

KR 101231085 B1 * 2/2013

OTHER PUBLICATIONS

Koo Hong Sik, Foreign Application KR101231085 B1, Feb. 7, 2013.*

* cited by examiner

*Primary Examiner* — Kent Chang
*Assistant Examiner* — Nelson Rosario
(74) *Attorney, Agent, or Firm* — Jefferson IP Law, LLP

(57) ABSTRACT

A method for controlling an electronic device is provided. The method includes detecting at least one conductive materials attached to a protection case, identifying a combination of the detected at least one conductive material corresponding to an arrangement of the at least one conductive material, mapping the combination of the detected at least one conductive material to an operational function of the electronic device according to user control, and storing a mapping result.

19 Claims, 23 Drawing Sheets

METHOD OF DETECTING PROTECTION CASE AND ELECTRONIC DEVICE THEREOF

CROSS-REFERENCE TO RELATED APPLICATION(S)

This application claims the benefit under 35 U.S.C. §119(a) of a Korean patent application field on Feb. 28, 2013 in the Korean Intellectual Property Office and assigned Serial No. 10-2013-0022206, the entire disclosure of which is hereby incorporated by reference.

TECHNICAL FIELD

The present disclosure relates to an electronic device. More particularly, the present disclosure relates to a method and apparatus for detecting a protection case in an electronic device.

BACKGROUND

Recently, with technology development, an electronic device provides various functions. For example, the electronic device according to the related art provides various functions, such as an alarm function, Short Messaging Service (SMS) function, Multimedia Message Service (MMS) function, E-mail function, game play function, communication function, image management function, multimedia function of providing audio and video content, and schedule functions.

As described above, as the functions of the electronic device are diversified, the electronic device tends to become expensive. Accordingly, a consumer purchasing the electronic device uses a separate protection case for the electronic device in a combined state in order to protect the exterior of the electronic device, to express individuality, and to improve a grip feeling. In particular, a user tends to have a plurality of protection cases with respect to one electronic device and tends to change the protection cases of the electronic device for usage according to a situation.

Such a protection case provides only a function for protecting the appearance of the electronic device when connected to the electronic device. In other words, a protection case according to the related art does not provide a separate special function. However, as the types of the protection case are diversified and the protection case is widely used, there is a need for a protection case for enabling an electronic device to perform a specific function beyond merely protecting when joined or otherwise connected to the electronic device, not a protection case for providing only a function of protecting the exterior of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for detecting conductive materials arranged randomly in the protection case of an electronic device and providing a touch input to the electronic device without a user's direct touch.

Another aspect of the present disclosure is to provide a method and apparatus for identifying a combination of conductive materials arranged randomly in a protection case, mapping the identified combination to an operational function of an electronic device, and storing the mapping result in the electronic device.

Another aspect of the present disclosure is to provide a method and apparatus for performing a predetermined operational function according to a combination of conductive materials arranged randomly in a protection case in an electronic device.

Another aspect of the present disclosure is to provide a method and apparatus for providing a predetermined function according to the dielectric constants and combination of conductive materials arranged in a protection case in an electronic device.

In accordance with an aspect of the present disclosure, a method for controlling an electronic device is provided. The method includes detecting at least one conductive materials attached to a protection case, identifying a combination of the detected at least one conductive materials corresponding to an arrangement of the at least one conductive material, mapping the combination of the detected at least one conductive material to an operational function of the electronic device according to user control, and storing a mapping result.

In accordance with another aspect of the present disclosure, an electronic device is provided. The electronic device includes at least one processor, a touch sensitive display, a memory, and at least one program stored in the memory and configured to be executable by the at least one processor, wherein the program includes instructions for: detecting at least one conductive material attached to a protection case, identifying a combination of the detected at least one conductive material corresponding to an arrangement of the at least one conductive material, mapping the combination of the detected at least one conductive material to an operational function of the electronic device according to user control, and storing a mapping result.

In accordance with another aspect of the present disclosure, a protection case is provided. The protection case includes a first surface including at least one first conductive material and configured to come into contact with a display panel of an electronic device, and a second conductive material connected to the first conductive material and having a dielectric constant equal to or greater than a threshold value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As a non-exhaustive illustration only, an electronic device may include a mobile communication terminal, a smart phone, a tablet PC, a Personal Digital Assistant (PDA), a digital camera, an MP3 player, a portable game console, a Portable/Personal Multimedia Player (PMP), a handheld e-book, a navigation device, a laptop computer, a laptop computer, a netbook, a computer, a television, a refrigerator, and an air conditioner, which are capable of touch input, and the like.

Figure 1A:
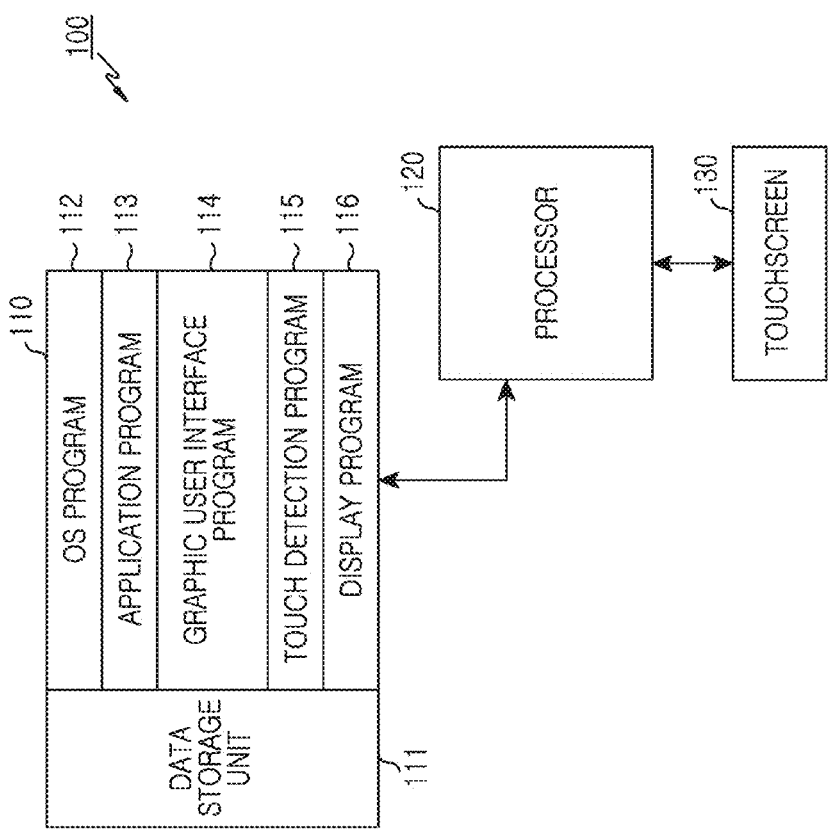
FIG. 1A is a diagram illustrating a block configuration of an electronic device for detecting a conductive material attached to a protection case and for performing a predetermined function according to an embodiment of the present disclosure.

FIG. 1A illustrates a block configuration of an electronic device for detecting a conductive material attached to a protection case and for performing a predetermined function according to an embodiment of the present disclosure.

Referring to FIG. 1A, the electronic device 100 includes a memory 110, a processor 120, and a touchscreen 130. The electronic device 100 may include a plurality of memories 110, and/or a plurality of processors 120.

For example, the memory 110 includes a data storage unit 111, an Operating System (OS) program 112, an application program 113, a Graphic User Interface (GUI) program 114, a touch detection program 115, a display program 116, and the like. In addition, because the program that is a software component may be represented as a set of instructions, the program may be referred to as an instruction set. The program may also be referred to as a module.

The memory 110 may store one or more programs including instructions for performing various embodiments of the present disclosure.

The data storage unit 111 stores data generated during the performance of a function corresponding to the program stored in the memory 110. According to various embodiments of the present disclosure, the data storage unit 111 stores a combination in which conductive materials are arranged randomly and a function mapped to the combination having a random arrangement. For example, the data storage unit 111 may store a first combination, a second combination and a third combination, in each of which conductive materials are arranged randomly and store a mapping table in which the first combination is mapped to a first function, the second combination is mapped to a second function, and the third combination is mapped to a third function.

The OS program 112 (e.g., WINDOWS, LINUX, Darwin, RTXC, UNIX, OS X, an embedded OS such as VxWorks, or the like) includes various software components for controlling general system operations. For example, general system operation controls may include memory control/management, storage hardware (device) control/management, and power control/management. The OS program 112 also performs a function for enabling smooth communication between various hardware components (devices) and software components (programs).

The application program 113 includes a browser application, an e-mail application, a message application, a word processing application, an address book application, a widget application, a Digital Right Management (DRM) application, a voice recognition application, a voice replication application, a position determining function application, a Location-Based Service (LBS) application, a telephone application, and the like.

The graphic user interface program 114 includes at least one software component for providing a graphic user interface between a user and the electronic device 100. For example, the graphic user interface program 114 includes at least one software component for displaying user interface information on the touchscreen 130. According to various embodiments of the present disclosure, the GUI program 114 includes an instruction for displaying a graphic element and interface corresponding to a predetermined function on a predetermined area of the touchscreen 130 when the combination of conductive materials is detected by the touch detection program 115. For example, the GUI program 114 includes an instruction for displaying a clock on a predetermined area of the touchscreen 130 when a conductive material is detected by the touch detection program 115. For example, the GUI program 114 includes an instruction for displaying a calendar on a predetermined area of the touchscreen 130 when a conductive material is detected by the touch detection program 115.

The touch detection program 115 may detect a conductive material attached to a protection case. According to various embodiments of the present disclosure, when a conductive material having a sufficient dielectric constant that is equal to or greater than a threshold value is contacted, the touch detection program 115 may recognize the contact as a touch.

In addition, when the contact of the conductive materials is detected, the touch detection program 115 identifies a combination in which the detected conductive materials are arranged randomly. Thereafter, the touch detection program 115 provides a user with a list including at least one operational function of the electronic device 100 which may be mapped to the combination in which the conductive materials are arranged randomly, and may map the operational function of the electronic device selected according to user control (e.g., according to user preference) to the combination in which the detected conductive materials are arranged randomly.

In addition, the touch detection program 115 identifies a combination in which the detected conductive materials are arranged randomly based on locations at which the conductive materials are detected. Specifically, the touch detection program 115 detects the combination in which one or more conductive materials that are attached to the protection case are arranged randomly, and determines whether the detected combination is matched with a pre-stored combination. Specifically, the touch detection program 115 identifies the respective (X, Y) coordinates of one or more conductive materials that are attached to the protection case are arranged randomly, and determines whether a first combination formed by the identified (X, Y) coordinates is previously stored in the memory. According to various embodiments of the present disclosure, the touch detection program 115 may identify a combination in which the detected conductive materials are arranged based on the (X, Y) coordinates of the detected conductive materials.

In addition, the touch detection program 115 may identify the dielectric constant of the conductive material attached to the protection case. Specifically, when the conductive material, which has a sufficient dielectric constant equal to or greater than a threshold value and is attached to the protection case, comes into contact with the touchscreen 130, the touch detection program 115 identifies the dielectric constant of the contacted conductive material. For example, the touch detection program 115 may detect four conductive materials, which have sufficient dielectric constants equal to or greater than a threshold value and are attached to the protection case, and identify the respective dielectric constants of the four detected conductive materials. According to various embodiments of the present disclosure, the dielectric constants of the four detected conductive materials may be different from each other. According to various embodiments of the present disclosure, when a conductive material comes into contact with the touchscreen 130, the threshold value is a minimum dielectric constant at which the touchscreen 130 may recognize the contact as a touch.

The display program 116 displays a graphic element and interface corresponding to a function mapped to a combination in which conductive materials are arranged randomly on a predetermined area of the touchscreen 130. Specifically, when the touch detection program 115 detects a combination in which conductive materials are arranged randomly, the display program 116 displays the data and/or images of the function, which is mapped to the combination having the random arrangement, according to the detected combination on a predetermined area of the touchscreen 130. For example, when the first combination mapped to a clock function is detected by the touch detection program 115, the display program 116 may display time data on a first predetermined area of the touchscreen 130. As another example, when the second combination mapped to a calendar function is detected by the touch detection program 115, the display program 116 may display a calendar image and data on a second predetermined area of the touchscreen 130. As still another example, when a third combination mapped to a locking function is detected by the touch detection program 115, the display program 116 may display an image and data which represent that the electronic device is switched to a locked state on a third predetermined area of the touchscreen 130. According to various embodiments of the present disclosure, the function (e.g., the locking function) corresponding to the combination having a random arrangement may be performed in the electronic device.

In addition, the display program 116 displays a graphic element and interface corresponding to a function mapped to a combination in which the dielectric constants of conductive materials and the conductive materials are arranged randomly on a predetermined area of the touchscreen 130 based on the combination in which the dielectric constants of the conductive materials and the conductive materials are arranged randomly. For example, the display program 116 may display the graphic element of a function corresponding to the dielectric constant of the detected conductive material. Accordingly, various embodiments of the present disclosure may dispose one or more conductive materials having various combinations and dielectric constants in a protection case and perform mapping to the various functions of the electric device 100.

Although not illustrated, the processor 120 may include at least one processor and a peripheral interface. In addition, the processor 120 executes a specific program (instruction set) stored in the memory 110 and performs a plurality of specific functions corresponding to the program.

The touchscreen 130 is a touch-sensitive display and provides an interface for touch input/output between the electronic device 100 and the user. The touchscreen 130 is a medium that detects a touch (or contact) through a touch sensor (not illustrated), transmits the detected touch input to the electronic device 100, and visually provides an output from the electronic device 100 to the user. For example, the touchscreen 130 provides a visual output, such as text, graphic, video, and the like to the user in response to the touch input.

The touchscreen 130 includes a touch-sensitive surface that accepts the user's touch input, and detects the user's touch input based on a haptic contact, a tactile contact, or a combination thereof. For example, a touch-detected point on the touchscreen 130 corresponds to the width of a finger used for contact with the touch sensitive surface. In addition, the touchscreen 130 detects a contact of an external device, such as a stylus pen, through the touch sensitive surface. The detected contact is converted into interaction with user-interface objects (e.g., soft key) that are displayed on the touchscreen.

The touchscreen 130 provides an interface for touch input/output between the electronic device 100 and the user. For example, the touchscreen 130 may be a medium that transmits the user's touch input to the electronic device 100 and visually provides an output from the electronic device 100 to the user. The touchscreen 130 may use various display technologies, such as a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), a Flexible LED (FLED), or the like. According to various embodiments of the present disclosure, the touchscreen 130 is not limited to touchscreens using the above-identified display technologies. In addition, the touchscreen 130 may detect the start, movement, stop or end of a contact on a touch sensitive surface by using various touch detection (or sensing) technologies such as capacitive detection, resistive detection, infrared detection, Surface Acoustic Wave (SAW) detection, and/or the like. According to various embodiments of the present disclosure, the touch screen 130 may detect conductive materials randomly attached to a protection case. Specifically, the touchscreen 130 may detect the contact of a conductive material having a sufficient dielectric constant that is equal to or greater than a threshold value, and recognize the contact as a touch. In addition, the touchscreen 130 may identify the respective dielectric constants of conductive materials in the contacts of the one or more detected conductive materials.

In addition, the touchscreen 130 may display a graphic element and interface corresponding to a predetermined function on a predetermined area of the touchscreen 130 when a predetermined combination of conductive materials is detected by the touch detection program 115. For example, the touchscreen 130 may display a clock image and time data on a predetermined area of the touchscreen 130 when the predetermined combination of conductive materials is detected.

Figure 1B:
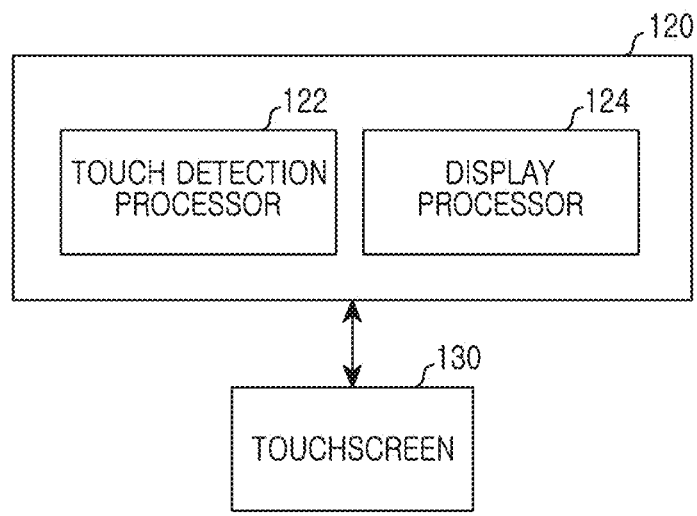
FIG. 1B is a diagram illustrating a block configuration of a processor for detecting a conductive material attached to a protection case and for performing a predetermined function according to an embodiment of the present disclosure.

FIG. 1B is a diagram illustrating a block configuration of a processor for detecting a conductive material attached to a protection case and for performing a predetermined function according to an embodiment of the present disclosure.

Referring to FIG. 1B, the processor 120 includes a touch detection processor 122 and a display processor 124.

The touch detection processor 122 may detect a conductive material attached to a protection case. According to various embodiments of the present disclosure, when a conductive material having a sufficient dielectric constant that is equal to or greater than a threshold value is contacted, the touch detection processor 122 may recognize the contact as a touch.

In addition, when the contact of the conductive materials is detected, the touch detection processor 122 identifies a combination in which the detected conductive materials are arranged randomly. Thereafter, the touch detection processor 122 provides a user with a list including the operational function of the electronic device 100 which may be mapped to the combination in which the conductive materials are arranged randomly, and may map the operational function of the electronic device selected according to user control (e.g., according to user preference) to the combination in which the detected conductive materials are arranged randomly.

In addition, the touch detection processor 122 identifies a combination in which the detected conductive materials are arranged randomly based on locations at which the conductive materials are detected. Specifically, the touch detection processor 122 detects the combination in which one or more conductive materials that are attached to the protection case are arranged randomly, and determines whether the detected combination is matched with a pre-stored combination. Specifically, the touch detection processor 122 identifies the respective (X, Y) coordinates of one or more conductive materials that are attached to the protection case, and determines whether a first pattern formed by the identified (X, Y) coordinates is previously stored in the memory. According to various embodiments of the present disclosure, the touch detection processor 122 may identify a combination in which the detected conductive materials are arranged based on the (X, Y) coordinates of the detected conductive materials.

In addition, the touch detection processor 122 may identify the dielectric constant of the conductive material attached to the protection case. Specifically, when the conductive material, which has a sufficient dielectric constant equal to or greater than a threshold value and is attached to the protection case, comes into contact with the touchscreen 130, the touch detection processor 122 identifies the dielectric constant of the contacted conductive material. For example, the touch detection processor 122 may detect four conductive materials, which have sufficient dielectric constants equal to or greater than a threshold value and are attached to the protection case, and identify the respective dielectric constants of the four detected conductive materials. According to various embodiments of the present disclosure, the dielectric constants of the four detected conductive materials may be different from each other. According to various embodiments of the present disclosure, when a conductive material comes into contact with the touchscreen 130, the threshold value is a minimum dielectric constant at which the touchscreen 130 may recognize the contact as a touch.

The display processor 124 displays a graphic element and interface corresponding to a function mapped to a combination in which conductive materials are arranged randomly on a predetermined area of the touchscreen 130. Specifically, when the touch detection processor 122 detects a combination in which conductive materials are arranged randomly, the display processor 124 displays the data and/or images of the function, which is mapped to the combination having the random arrangement, according to the detected combination on a predetermined area of the touchscreen 130. For example, when the first combination mapped to the clock function is detected by the touch detection processor 122, the display processor 124 may display time data on a first predetermined area of the touchscreen 130. As another example, when a second combination mapped to a calendar function is detected by the touch detection processor 122, the display processor 124 may display a calendar image and data on a second predetermined area of the touchscreen 130. As still another example, when a third combination mapped to a locking function is detected by the touch detection processor 122, the display processor 124 may display an image and data which represent that the electronic device is switched to a locked state on a third predetermined area of the touchscreen 130. According to various embodiments of the present disclosure, the function (e.g., the locking function) corresponding to the detected pattern is performed in the electronic device.

In addition, the display processor 124 may display a graphic element and interface corresponding to a function mapped to a combination in which the dielectric constants of conductive materials and the conductive materials are arranged randomly on a predetermined area of the touchscreen 130 based on the combination in which the dielectric constants of the conductive materials and the conductive materials are arranged. For example, the display processor 124 may display the graphic element of a function corresponding to the dielectric constant of the detected conductive material. Accordingly, various embodiments of the present disclosure may dispose one or more conductive materials having various combinations and dielectric constants in a protection case and perform mapping to the various functions of the electric device 100.

Figure 2A:
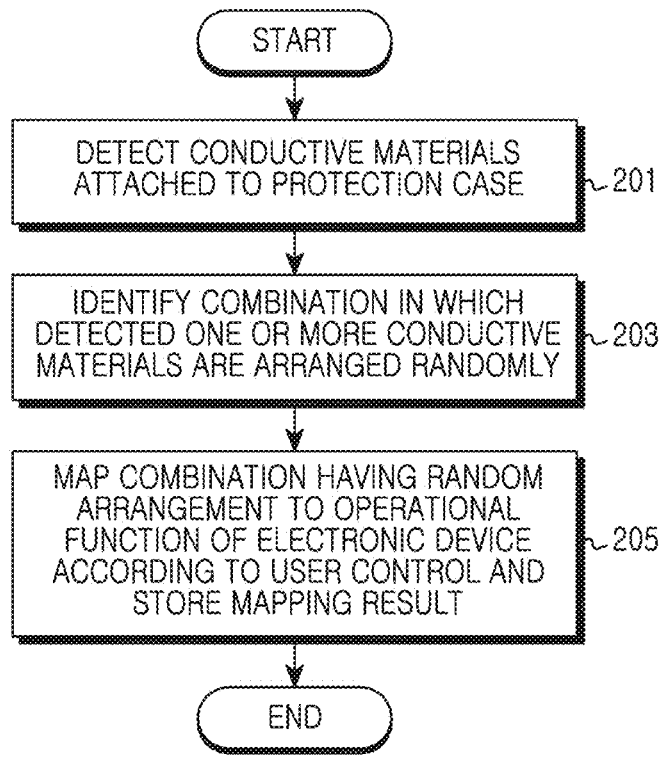
FIG. 2A is a diagram illustrating a process for performing a predetermined function according to conductive materials attached to a protection case in an electronic device according to an embodiment of the present disclosure.

FIG. 2A illustrates a process for performing a predetermined function according to conductive materials attached to a protection case in an electronic device according to an embodiment of the present disclosure.

Referring to FIG. 2A, at operation 201, the electronic device 100 detects conductive materials attached to the protection case. Specifically, the electronic device 100 may detect the contacts of the conductive materials attached to the protection case and recognize the detected contacts as a touch input. As an example, the conductive material may be a material having a sufficient dielectric constant that is equal to or greater than a threshold value at which the electronic device 100 may recognize the contact as a touch when the conductive material comes into contact with the electronic device 100.

At operation 203, the electronic device 100 identifies a combination in which the detected conductive materials are arranged randomly. For example, the electronic device 100 identifies how one or more conductive materials attached to the protection case are arranged based on locations at which the conductive materials are detected. In addition, the electronic device 100 may identify the respective dielectric constants of the detected conductive materials and identify a combination in which the respective conductive materials having different dielectric constants are arranged. For example, the electronic device 100 may identify a combination in which a first conductive material and a second conductive material having different dielectric constants are arranged.

Thereafter, at operation 205, the electronic device 100 maps the operational function of the electronic device according to user control (e.g., according to user preference) to the combination having the random arrangement and stores the mapping result. For example, after detecting the combination of conductive materials that are arranged randomly, the electronic device 100 provides a list of operational functions which may be mapped to the combination, and maps the combination of the conductive materials to an operational function selected according to the user control (e.g., according to user preference). For example, after detecting a first combination of conductive materials that are arranged randomly, the electronic device 100 provides a list of operational functions, such as a calendar display function, a locking function, a lock-release function, a voice communication function, and the like, which may be mapped to the combination to the user. Thereafter, the electronic device 100 may map a first combination to the calendar display function selected from the list of operational functions according to user control (e.g., according to user preference) and store the mapping result. As another example, the electronic device 100 detects a second combination of conductive materials which are arranged randomly and provides the list of operational functions which may be mapped to the second combination to the user. Thereafter, the electronic device 100 may map the second combination to the clock display function selected from the list of operational functions according to user control (e.g., according to user preference) and store the mapping result.

Figure 2B:
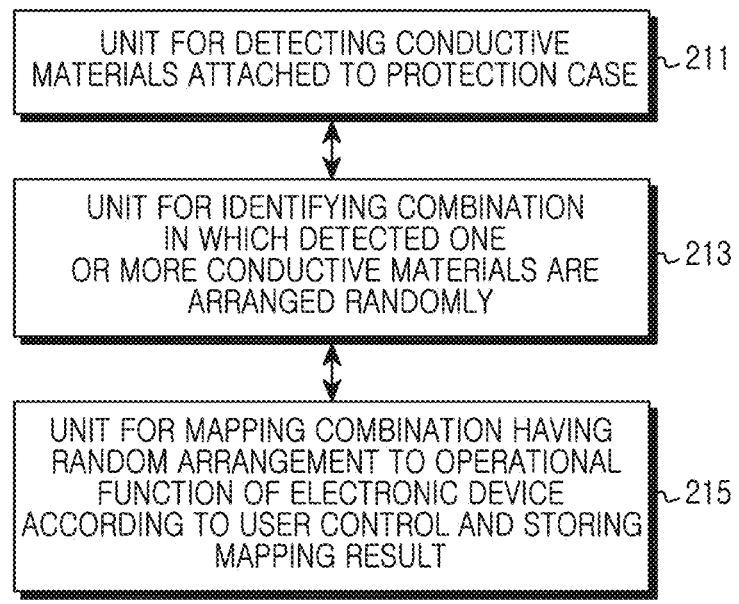
FIG. 2B is a diagram illustrating a unit for performing a predetermined function according to conductive materials attached to a protection case in an electronic device according to an embodiment of the present disclosure.

FIG. 2B illustrates a unit for performing a predetermined function according to conductive materials attached to a protection case in an electronic device according to an embodiment of the present disclosure.

Referring to FIG. 2B, the electronic device 100 includes a unit 211 for detecting conductive materials attached to a protection case. Specifically, the electronic device 100 may include a unit for detecting the contacts of the conductive materials attached to the protection case and a unit for recognizing the detected contacts as a touch.

In addition, the electronic device 100 includes a unit 213 for identifying a combination of the detected conductive materials that are arranged randomly. For example, the electronic device 100 includes a unit for identifying locations at which one or more conductive materials are detected and a unit for identifying a combination in which the locations (e.g., X and Y coordinates) are arranged.

In addition, the electronic device 100 includes a unit 215 for mapping the combination having the random arrangement to an operational function of the electronic device 100 according to user control (e.g., according to user preference) and storing the mapping result. According to various embodiments of the present disclosure, the electronic device 100 may further include a unit for providing a list of operational functions of the electronic device 100 which may be mapped to an identified combination. The operational functions included in the list of operational functions of the electronic device 100 may be different according to respective types of electronic devices.

Figure 3A:
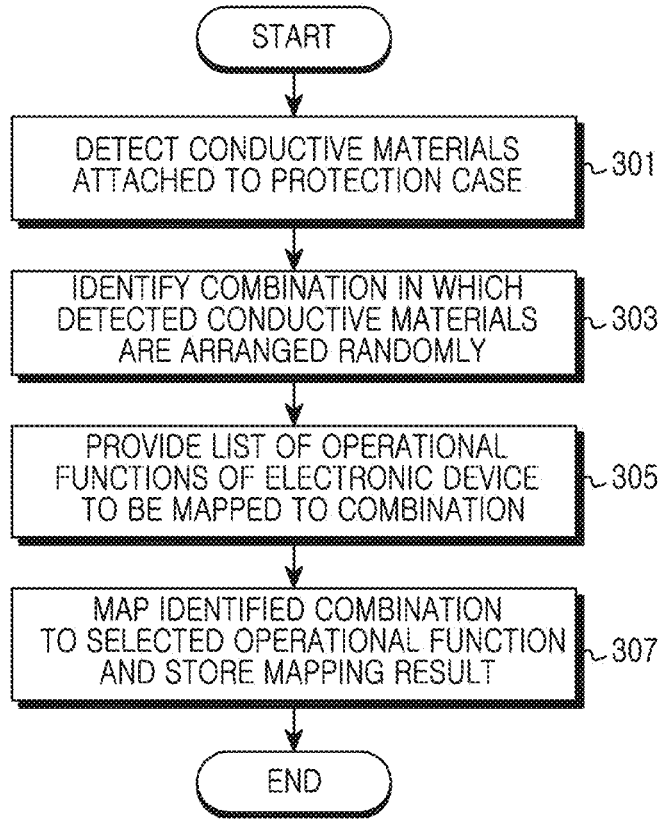
FIG. 3A is a diagram illustrating a process for mapping conductive materials attached to a protection case to an operational function of an electronic device in the electronic device according to an embodiment of the present disclosure.

FIG. 3A illustrates a process for mapping conductive materials attached to a protection case to an operational function of an electronic device in the electronic device according to an embodiment of the present disclosure.

Referring to FIG. 3A, at operation 301, the electronic device 100 detects conductive materials attached to the protection case. According to various embodiments of the present disclosure, the electronic device 100 may recognize a combination of conductive materials randomly arranged and may enter a state in which a menu for mapping of the combination to an operational function of the electronic device 100 is selected or a mode for mapping of the combination to an operational function.

At operation 303, the electronic device 100 identifies a combination in which the detected conductive materials are arranged randomly. According to various embodiments of the present disclosure, the electronic device 100 may determine whether the combination of the detected conductive materials is previously stored and if stored, may display a message representing that the combination is previously stored. In addition, when the combinations of the detected conductive materials are identical to one another, the electronic device 100 may identify the respective dielectric constants of the conductive materials which are additionally detected. Accordingly, although multiple combinations of conductive materials of the protection case represent an identical pattern, the combinations may be differentiated according the dielectric constants. Therefore, the duplication of the protection case is difficult in production and malfunction according to conductive materials is prevented in the electronic device 100.

Thereafter, at operation 305, the electronic device 100 provides a list of operational functions of the electronic device 100 which are to be mapped to the combination. According to various embodiments of the present disclosure, the electronic device 100 may display at least one operational function which may be performed in the electronic device 100.

Thereafter, at operation 307, the electronic device 100 maps the identified combination to the selected operational function and stores the mapping result. For example, the electronic device may map a first combination to a first operational function and store the mapping result. As another example, the electronic device may map a second combination to a second operational function and store the mapping result.

Figure 3B:
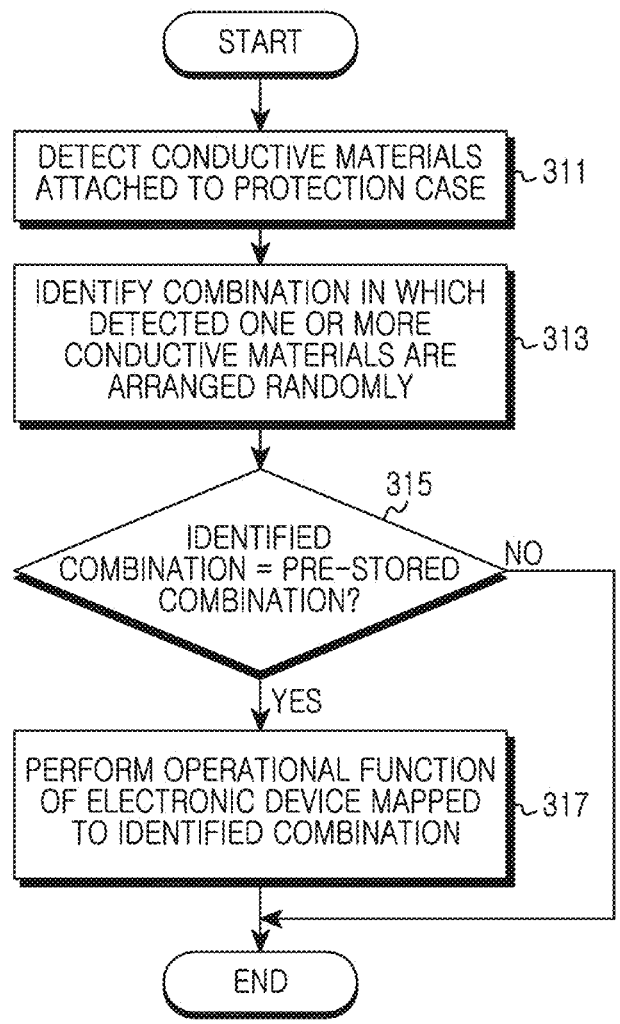
FIG. 3B is a diagram illustrating a process for performing a predetermined function according to a combination of conductive materials attached to a protection case in an electronic device according to an embodiment of the present disclosure.
Figure 4:
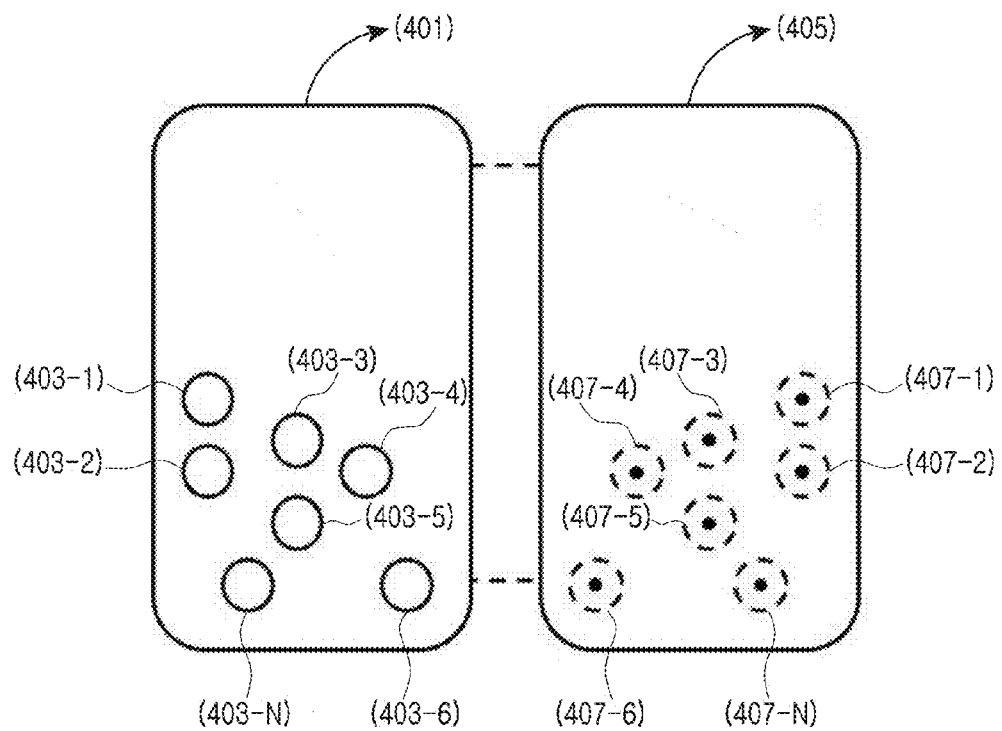
FIG. 4 is a diagram illustrating conductive materials disposed in a front surface of a protection case of an electronic device and recognition points at which the electronic device recognizes the conductive materials in the electronic device according to an embodiment of the present disclosure.
Figure 5:
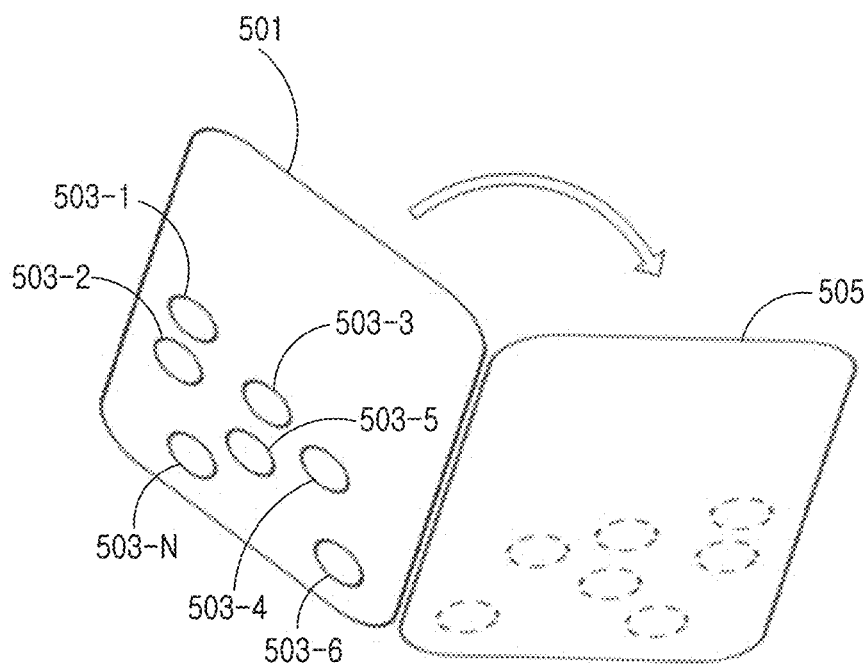
FIG. 5 is a diagram illustrating an example in which a protection case to which conductive materials are attached is closed in an electronic device according to an embodiment of the present disclosure.
Figure 6:
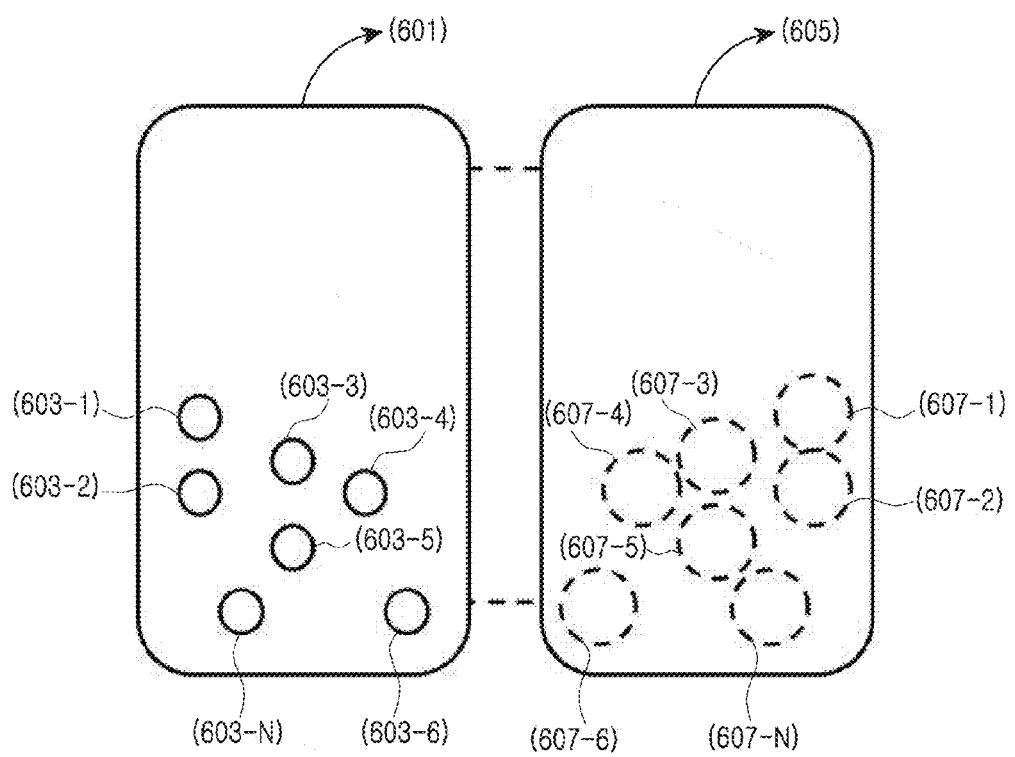
FIG. 6 is a diagram illustrating conductive materials disposed in a front surface of a protection case of an electronic device and recognition ranges at which the electronic device recognizes the conductive materials in the electronic device according to an embodiment of the present disclosure.
Figure 7:
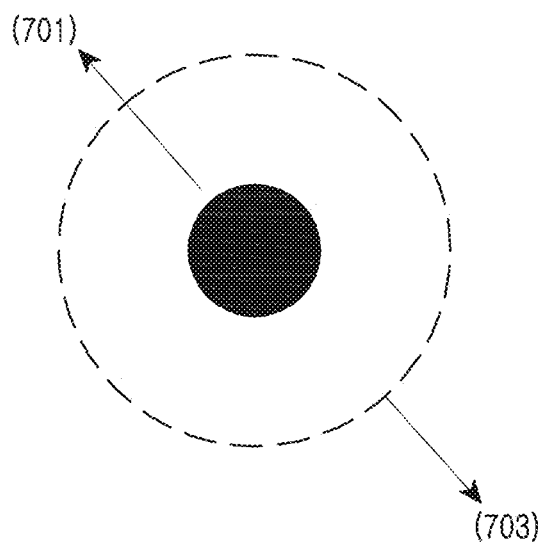
FIG. 7 is a diagram illustrating a tolerance of recognition points at which an electronic device recognizes conductive materials according to an embodiment of the present disclosure.
Figure 8:
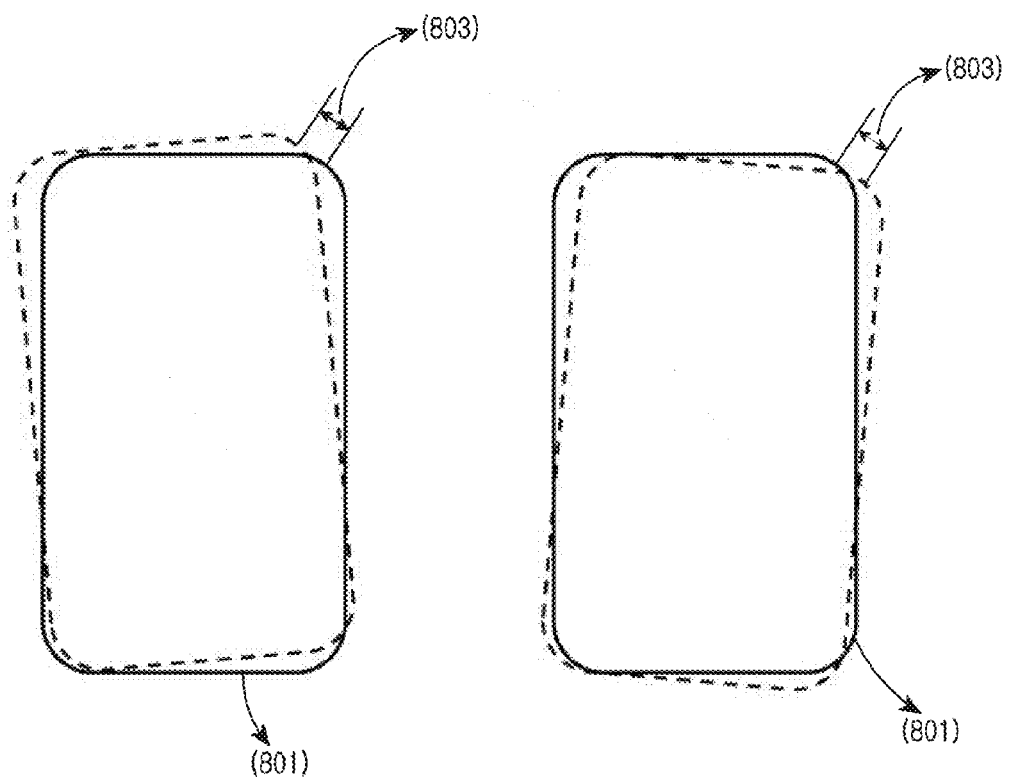
FIG. 8 is a diagram illustrating a tolerance of a protection case for an electronic device according to an embodiment of the present disclosure.
Figure 9:
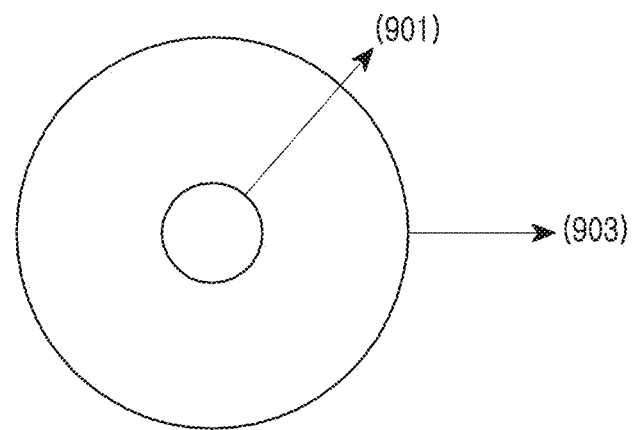
FIG. 9 is a diagram illustrating a size of conductive materials attached to a front surface of a protection case for an electronic device according to an embodiment of the present disclosure.
Figure 10:
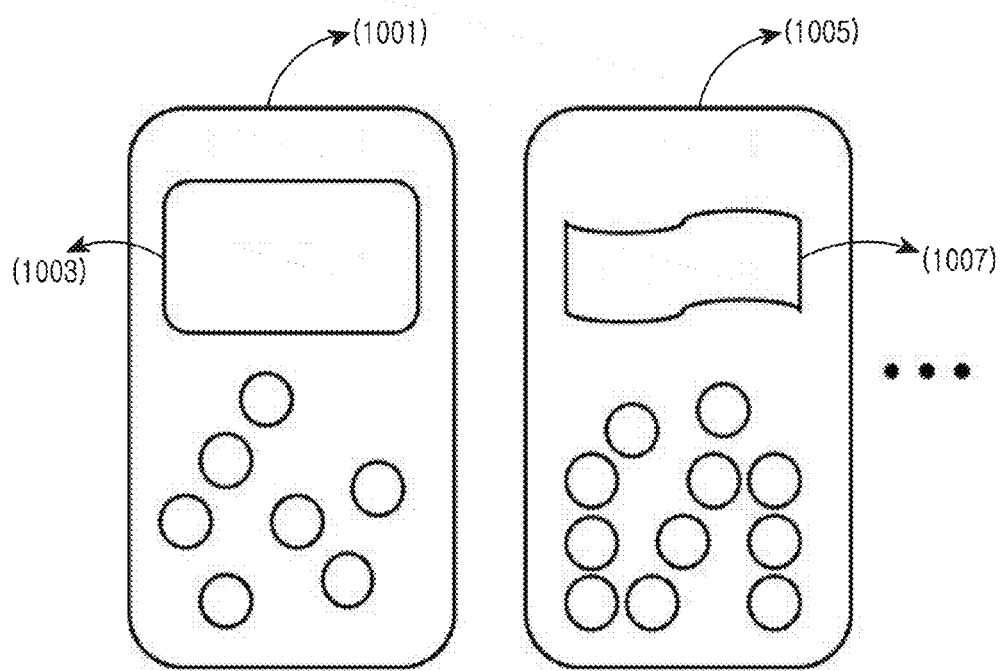
FIG. 10 is a diagram illustrating an example of performing different functions according to a pattern of conductive materials disposed in a protection case for an electronic device according to an embodiment of the present disclosure.
Figure 11:
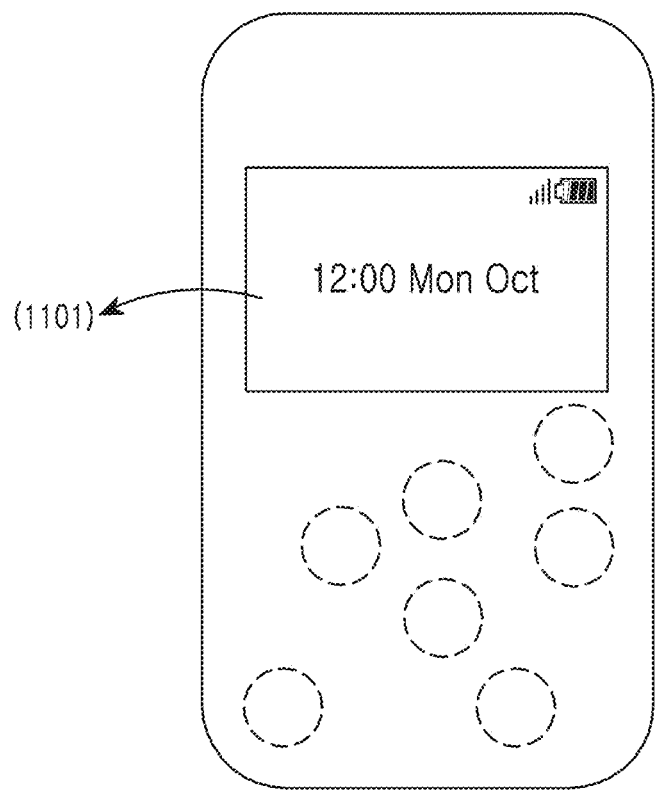
FIG. 11 is a diagram illustrating an example of display data according to a pattern of conductive materials disposed in a protection case for an electronic device according to an embodiment of the present disclosure.

FIG. 3B is a diagram illustrating for performing a predetermined function according to a combination of conductive materials attached to a protection case in an electronic device according to an embodiment of the present disclosure. FIG. 4 is a diagram illustrating conductive materials disposed in a front surface of a protection case of an electronic device and recognition points at which the electronic device recognizes the conductive materials in the electronic device according to an embodiment of the present disclosure. FIG. 5 is a diagram illustrating an example in which a protection case to which conductive materials are attached is closed in an electronic device according to an embodiment of the present disclosure. FIG. 6 is a diagram illustrating conductive materials disposed in a front surface of a protection case of an electronic device and recognition ranges at which the electronic device recognizes the conductive materials in the electronic device according to an embodiment of the present disclosure. FIG. 7 is a diagram illustrating a tolerance of recognition points at which an electronic device recognizes conductive materials according to an embodiment of the present disclosure. FIG. 8 is a diagram illustrating a tolerance of a protection case for an electronic device according to an embodiment of the present disclosure. FIG. 9 is a diagram illustrating a size of conductive materials attached to a front surface of a protection case for an electronic device according to an embodiment of the present disclosure. FIG. 10 is a diagram illustrating an example of performing different functions according to a pattern of conductive materials disposed in a protection case for an electronic device according to an embodiment of the present disclosure. FIG. 11 is a diagram illustrating an example of display data according to a pattern of conductive materials disposed in a protection case for an electronic device according to an embodiment of the present disclosure.

Referring to FIG. 3B, at operation 311, the electronic device 100 detects conductive materials attached to the protection case. For example, referring to FIG. 4, the electronic device 100 detects whether conductive materials 403-1 to 403-N attached to the front surface or contact surface 401 of the protection case come into contact with the display panel 405 of the electronic device 100. According to various embodiments of the present disclosure, the electronic device 100 may recognize the contacts as a touch, and determine locations at which the contact of the conductive materials 403-1 to 403-N are detected in the touch panel 405 as touch recognition points 407-1 to 407-N. Referring to FIG. 5, when the protection case is closed, the conductive materials 503-1 to 503-N attached to the contact surface 501 of the protection case may come into contact with the display panel 505 of the electronic device 100.

In addition, the electronic device 100 sets the range of a touch recognition point to be larger than the size of a conductive material attached to the protection case, thereby improving the touch recognition rate of the conductive material. For example, referring to FIG. 6, the electronic device 100 may set the ranges 607-1 to 607-N of the touch recognition points of the display panel 605 which detect the conductive materials 603-1 to 603-N attached to the front surface or contact surface 601 of the protection case to be larger than the size of the conductive materials 603-1 to 603-N. As another example, referring to FIG. 7, the electronic device 100 may set the range 703 of a touch recognition point with respect to one touch recognition point 701. According to various embodiments of the present disclosure, the electronic device 100 may set the size of a touch recognition range such that the ranges of touch recognition points with respect to different touch recognition points do not overlap with each other.

According to various embodiments of the present disclosure, setting the range of a touch recognition point to be larger than the size of a conductive material is for coping with a situation in which the front surface or contact surface of the protection case may come into contact with the display panel of the electronic device 100 in an offset arrangement. Referring to FIG. 8, the reason for setting the range of a touch recognition point to be larger than the size of a conductive material is to enable touch recognition by the contact of the conductive material disposed in the front surface or contact surface 801 of the protection case in the electronic device 100 for example, although a tolerance (error range) 803 occurs between the front surface or contact surface of the protection case and the display panel of the electronic device 100.

In addition, referring to FIG. 9, the electronic device 100 may set the size of one recognition point for recognition of one touch to be larger than a minimum size 901 that makes touch recognition possible by the electronic device 100 and be smaller than a maximum size 903.

Thereafter, at operation 313, the electronic device 100 identifies a combination in which the detected conductive materials are arranged randomly.

At operation 315, the electronic device 100 determines whether the identified combination is matched with a pre-stored combination.

If the electronic device 100 determines that the identified combination is matched with a pre-stored combination at step 315, then the electronic device 100 may proceed to operation 317 at which the electronic device 100 performs the operational function mapped to the identified combination. For example, the identified combination is matched with the pre-stored combination, the electronic device 100 performs an operational function of the electronic device 100 mapped to the pre-stored combination on a predetermined area of the display device. According to various embodiments of the present disclosure, the electronic device 100 may display a graphic element, and interface according to the operational function. In order to perform display on the predetermined area of the display device in the electronic device according to various embodiments of the present disclosure, the protection case has a window which allows a graphic and interface displayed on the display panel to be viewed by the user when the protection case is in a closed state. According to various embodiments of the present disclosure, the window is a portion formed by cutting out a predetermined area of the protection case or a portion which a transparent material (e.g., glass, vinyl, or the like) that allows the user to visually recognize an object disposed in the rear surface of the protection case is attached to. In addition, the shape of the window of the protection case may vary according to respective protection cases. For example, referring to FIG. 10, the shape of the window 1003 of a first protection case 1001 may be different from the shape of the window 1007 of a second protection case 1005.

As described above, the protection case has a window having a specific shape. Therefore, referring to FIG. 11, when the protection case is closed and the front surface or contact surface comes into contact with the electronic device 100, the electronic device 100 may display images, data, and interface corresponding to a function mapped to a combination of the conductive materials of the protection case on a predetermined area of the display device 1101. Herein, the predetermined area of the display device may be set based on the location of the window of the protection case, and the electronic device 100 may store information about the predetermined area with respect to each combination of conductive materials and/or each dielectric constant of the conductive material.

In contrast, if the electronic device 100 determines that the identified combination is not matched with a pre-stored combination at step 315, then the electronic device 100 may end the process.

A configuration of the protection case will be described in detail below with reference to FIGS. 12 to 20.

Figure 12:
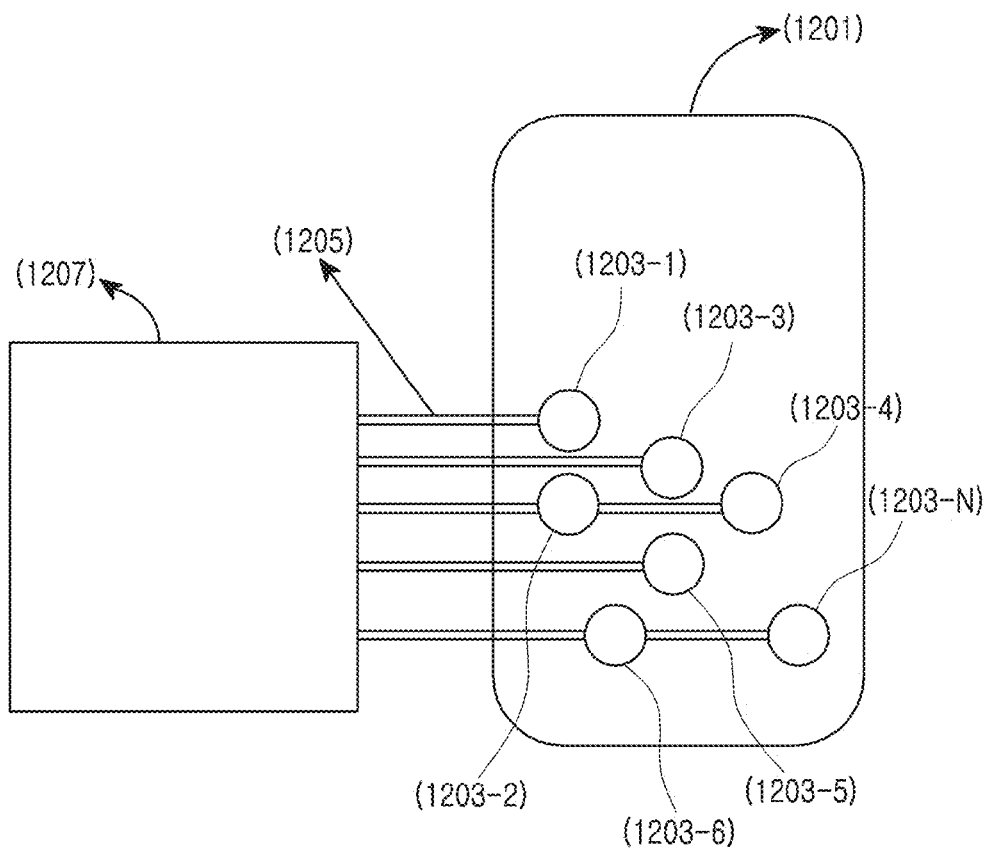
FIG. 12 is a diagram illustrating an example of connecting conductive materials attached to a front surface or contact surface of a protection case to a conductive material having an dielectric constant equal to or greater than a threshold value by using conductive connection lines in a protection case according to an embodiment of the present disclosure.

FIG. 12 illustrates an example of connecting conductive materials attached to a front surface or contact surface of a protection case to a conductive material having a dielectric constant equal to or greater than a threshold value by using conductive connection lines in a protection case according to an embodiment of the present disclosure.

Referring to FIG. 12, the protection case includes the front surface or contact surface 1201 of the protection case, one or more conductive materials 1203-1 to 1203-N which are randomly attached to the front surface or contact surface 1201 of the protection case to form a specific combination, at least one conductive connection line 1205, and a conductive material 1207 having a sufficient dielectric constant equal to or greater than a threshold value. According to various embodiments of the present disclosure, the conductive material 1203-1 to 1203-N attached to the front surface or contact surface 1201 of the protection case, and the conductive material 1207 having a sufficient dielectric constant equal to or greater than the threshold value are connected to each other through at least one connection line 1205 made of conductive material. According to various embodiments of the present disclosure, in order to cope with a situation in which the conductive material 1203-N attached to the front surface or contact surface 1201 of the protection case has a dielectric constant insufficient to be recognized as a touch in the electronic device 100, the conductive material 1207 having the sufficient dielectric constant equal to or greater than the threshold value is connected to the conductive material 1203-N attached to the front surface or contact surface 1201. Therefore, when the conductive material 1203-N attached to the front surface or contact surface 1201 comes into contact with the display panel of the electronic device 100, the contact is recognized as a touch. According to various embodiments of the present disclosure, the conductive material 1207 having the sufficient dielectric constant equal to or greater than the threshold value may be a material having a relatively high dielectric constant, such as aluminum or copper.

Figure 13:
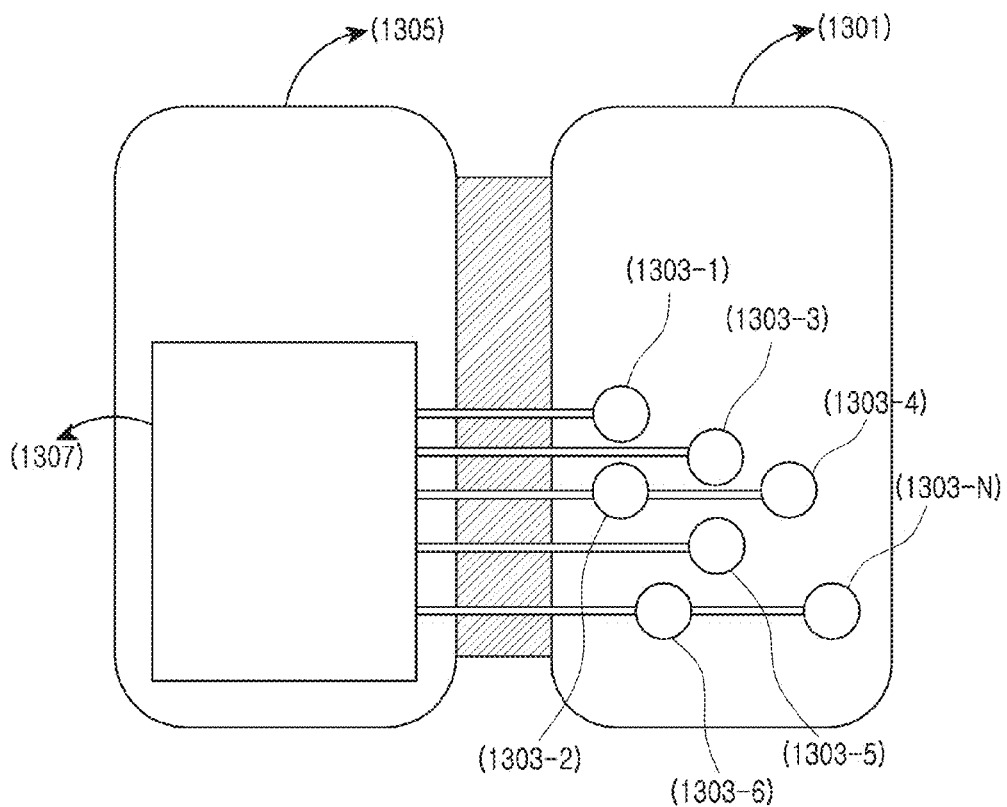
FIG. 13 is a diagram illustrating an example of connecting a conductive material having an dielectric constant equal to or greater than a threshold value to a rear surface of a protection case according to an embodiment of the present disclosure.

FIG. 13 is a diagram illustrating an example of connecting a conductive material having a dielectric constant equal to or greater than a threshold value to a rear surface of a protection case according to an embodiment of the present disclosure.

Referring to FIG. 13, the protection case includes one or more conductive materials 1303-1 to 1302-N that form a specific combination in the front surface or contact surface 1301 of the protection case, and a conductive material 1307 having a sufficient dielectric constant equal to or greater than a threshold value in the rear surface 1305 of the protection case.

Figure 14:
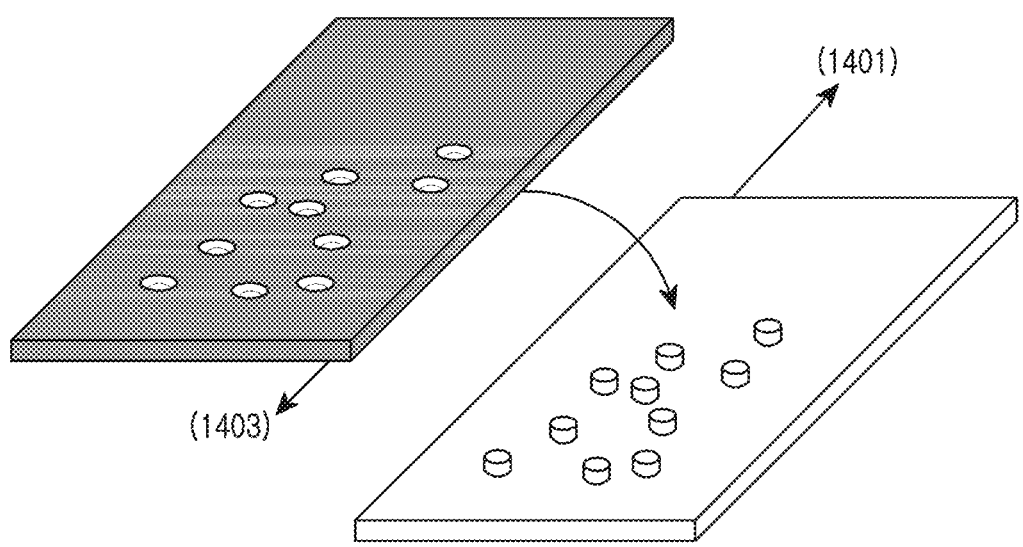
FIG. 14 is a diagram illustrating an example of connecting a conductive material having a dielectric constant equal to or greater than a threshold value to a non-conductive material in a protection case according to an embodiment of the present disclosure.

FIG. 14 is a diagram illustrating an example of connecting a conductive material having a dielectric constant equal to or greater than a threshold value to a non-conductive material in a protection case according to an embodiment of the present disclosure.

Referring to FIG. 14, the front surface or contact surface of a protection case may be formed of a conductive material 1401 having a dielectric constant equal to or greater than a threshold value and a non-conductive material 1403.

The conductive material 1401 having the insufficient dielectric constant equal to or greater than the threshold value may include at least one protrusion (touch recognition point) that forms a specific combination in the plane surface of the conductive material 1401 having the insufficient dielectric constant equal to or greater than the threshold value.

The non-conductive material 1403 includes a hole having a same shape as that of the protrusion at a location corresponding to the location of the protrusion (touch recognition point) of the conductive material 1401 having the insufficient dielectric constant equal to or greater than the threshold value, thereby connecting to the conductive material 1401 having the insufficient dielectric constant equal to or greater than the threshold value.

Figure 15:
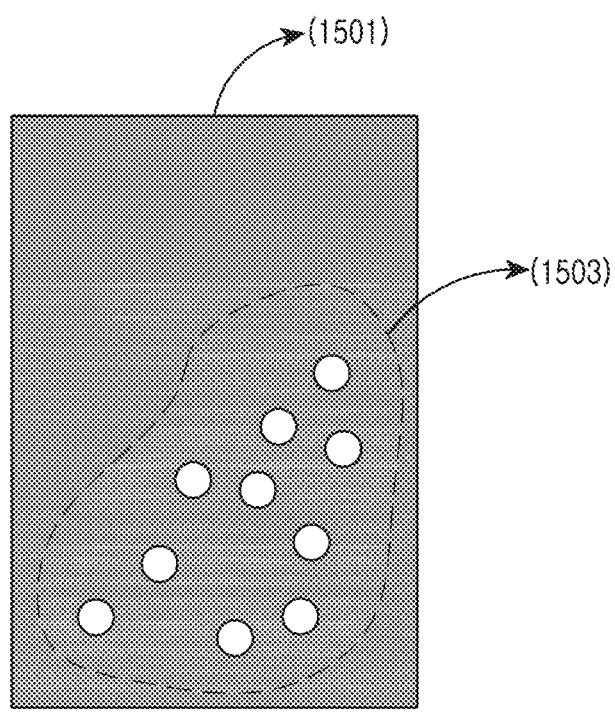
FIG. 15 is a diagram illustrating an example of connecting a conductive material having a dielectric constant equal to or greater than a threshold value to a non-conductive material in a protection case according to an embodiment of the present disclosure.

FIG. 15 is a diagram illustrating an example in which a conductive material having a dielectric constant equal to or greater than a threshold value is connected to a non-conductive material in a protection case according to an embodiment of the present disclosure.

Referring to FIG. 15, the front surface or contact surface 1501 of a protection case may be configured by connecting a conductive material having a dielectric constant equal to or greater than a threshold value to a non-conductive material. According to various embodiments of the present disclosure, the front surface or contact surface 1501 of the protection case may include a specific combination 1503 configured by conductive materials by connecting protrusions (touch recognition point) of a conductive material having a sufficient dielectric constant equal to or greater than a threshold value to the locations of holes of non-conductive material.

Figure 16:
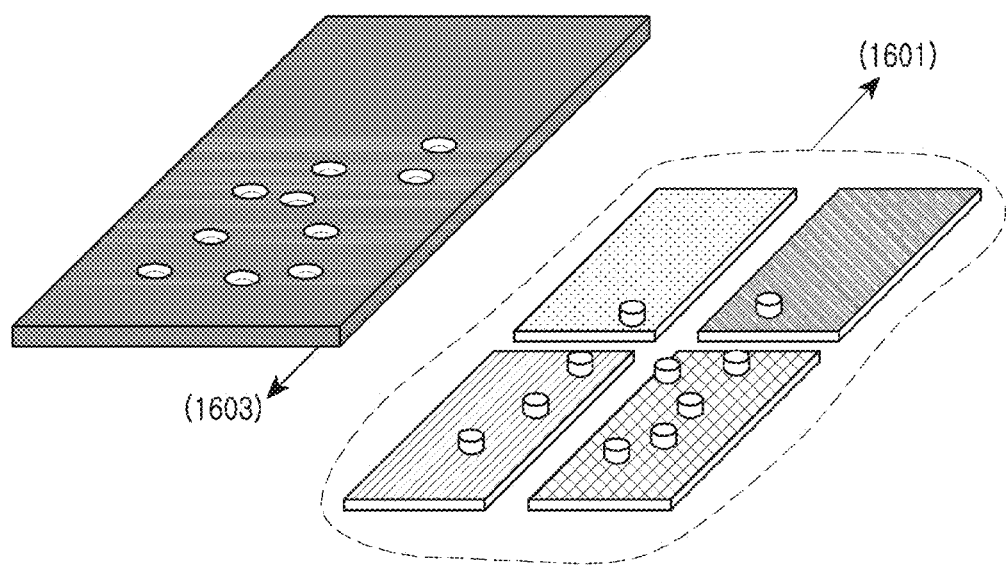
FIG. 16 is a diagram illustrating an example of connecting a plurality of conductive materials having different dielectric constants equal to or greater than a threshold value to a non-conductive material in a protection case according to an embodiment of the present disclosure.

FIG. 16 is a diagram illustrating an example of connecting a plurality of conductive materials having different dielectric constants equal to or greater than a threshold value to a non-conductive material in a protection case according to an embodiment of the present disclosure.

Referring to FIG. 16, the front surface or contact surface of a protection case may be formed by connecting at least two conductive materials 1601 having different dielectric constants equal to or greater than a threshold value to a non-conductive material 1603. According to various embodiments of the present disclosure, at least two conductive materials 1601 having sufficient dielectric constants equal to or greater than the threshold value may have at least two different dielectric constants. For example, when the number of conductive materials 1601 having sufficient dielectric constants equal to or greater than the threshold value is four, the four conductive materials may have different dielectric constants. According to various embodiments of the present disclosure, the respective conductive materials 1601 may include at least one protrusion (e.g., touch recognition point), and protrusions included in adjacent conductive materials 1601 may form a specific combination.

Figure 17:
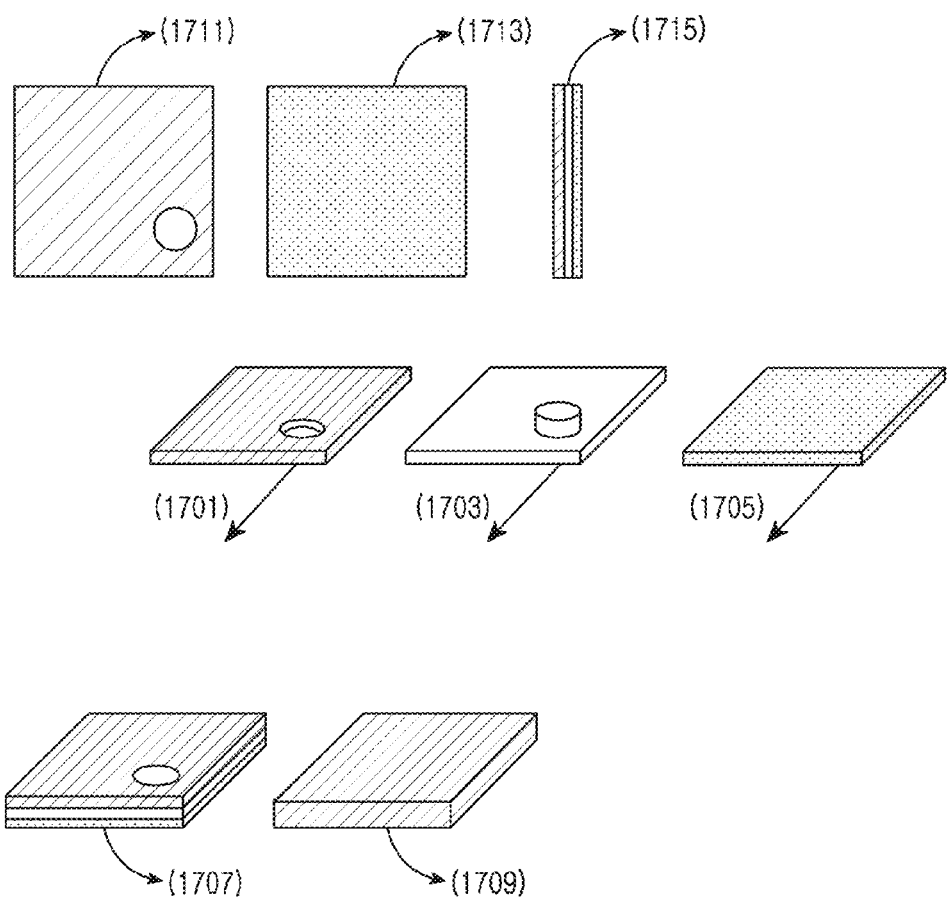
FIG. 17 is a diagram illustrating a configuration of a front surface or contact surface of a protection case that reflects user requirements according to an embodiment of the present disclosure.

FIG. 17 illustrates a configuration of a front surface or contact surface of a protection case that reflects user requirements according to an embodiment of the present disclosure.

Referring to FIG. 17, the front surface or contact surface of a protection case that reflects user requirements may be formed of a non-conductive material 1701, a conductive material 1703 having a sufficient dielectric constant equal to or greater than a threshold value, and a conductive adhesive material 1705. In particular, the protection case that reflects user requirements is formed by at least one touch recognition block 1707. According to various embodiments of the present disclosure, the touch recognition block 1707 is formed by connecting the conductive adhesive material 1705 to the rear surface of the conductive material 1703 having a sufficient dielectric constant equal to or greater than a threshold value in a state in which the non-conductive material 1701 including a hole at a certain location is connected to the conductive material 1703 having a sufficient dielectric constant equal to or greater than a threshold value and including a protrusion at a location corresponding to the location of the hole of the non-conductive material 1701. According to various embodiments of the present disclosure, the rear surface refers to a surface that does not include a protrusion among both surfaces of the conductive material 1703. The front surface 1711, rear surface 1713, and side surface 1715 of the touch recognition block 1707 may be configured as illustrated in FIG. 17.

In addition, the front surface and contact surface of the protection case that reflects user requirements may include at least one non-conductive block 1709.

Figure 18:
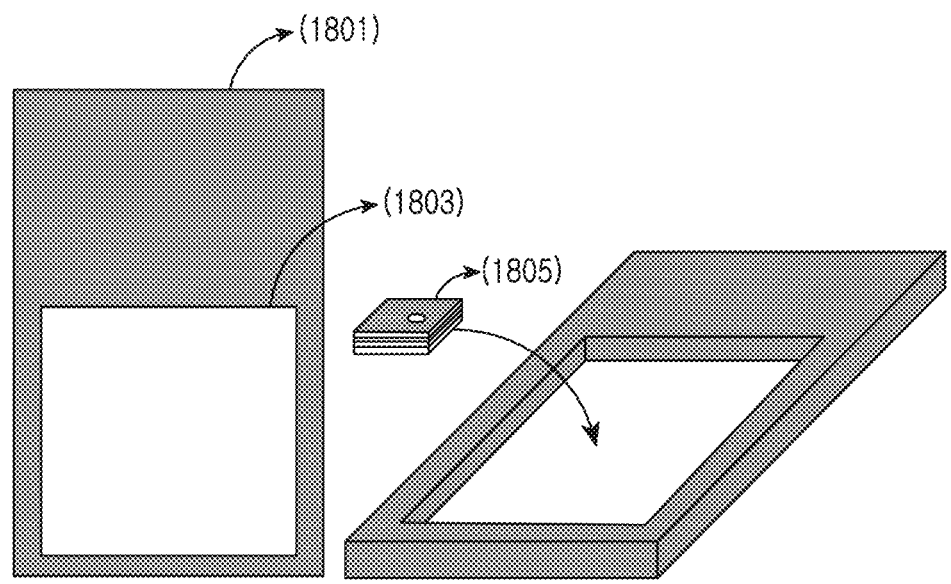
FIG. 18 is a diagram illustrating an example of connection of a front surface or contact surface of a protection case that reflects user requirements according to an embodiment of the present disclosure.

FIG. 18 is a diagram illustrating an example of connection of a front surface or contact surface of a protection case that reflects user requirements according to an embodiment of the present disclosure.

Referring to FIG. 18, in the front surface or contact surface 1801 of the protection case that reflects user requirements may be formed by directly disposing, by a user, a touch recognition block 1805 on a surface 1803 made of a material having a sufficient dielectric constant equal to or greater than a threshold value in the inside area of the front surface or contact surface 1801 of the protection case.

Figure 19:
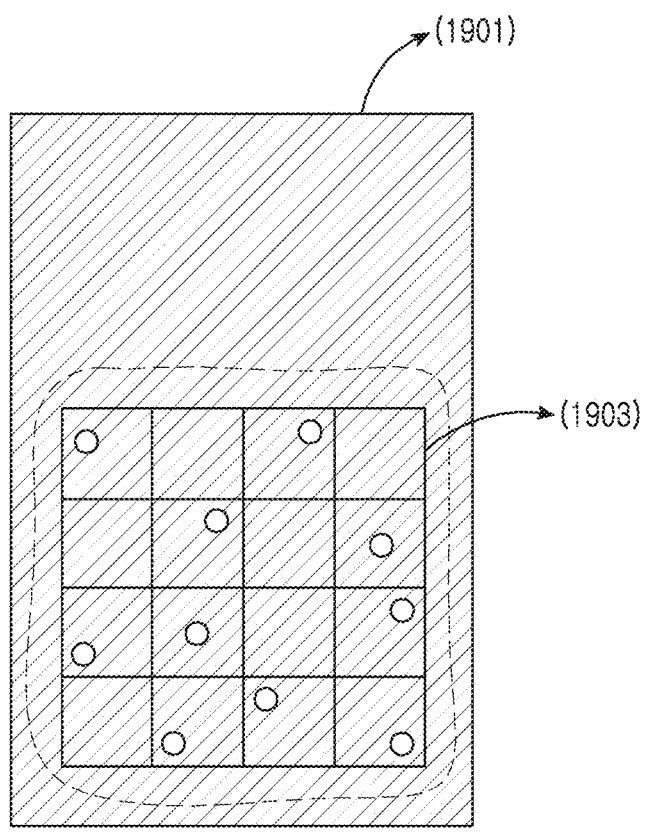
FIG. 19 is a diagram illustrating a front surface or contact surface of a protection case that reflects user requirements according to an embodiment of the present disclosure.

FIG. 19 is a diagram illustrating a front surface or contact surface of a protection case that reflects user requirements according to an embodiment of the present disclosure.

Referring to FIG. 19, the front surface or contact surface 1901 of a protection case that reflects user requirements includes a plurality of touch recognition blocks 1903 that are arranged according user control (e.g., according to user preference). According to various embodiments of the present disclosure, the front surface or contact surface 1901 of the protection case has a specific pattern formed by protrusions of conductive material respectively included in the plurality of touch recognition blocks 1903.

Figure 20:
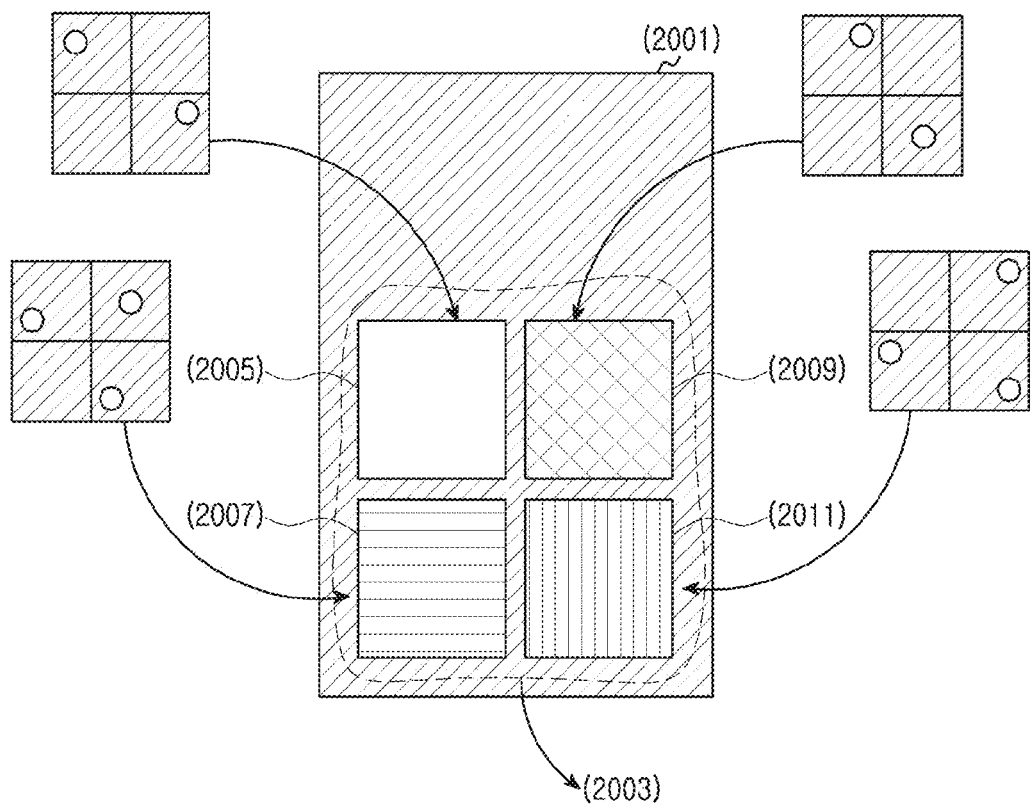
FIG. 20 is a diagram illustrating an example of connection of a front surface or contact surface of a protection case that reflects user requirements according to an embodiment of the present disclosure.

FIG. 20 is a diagram illustrating an example of connection of a front surface or contact surface a protection case that reflects user requirements and according to an embodiment of the present disclosure.

Referring to FIG. 20, the front surface or contact surface 2001 of a protection case that reflects user requirements may include a surface 2003 made of a material having a sufficient dielectric constant equal to or greater than a threshold value. The surface 2003 made of the material having a sufficient dielectric constant equal to or greater than a threshold value may be divided into a plurality of areas 2005, 2007, 2009, and 2011, and may include different dielectric constants for the respective areas 2005, 2007, 2009, and 2011. According to various embodiments of the present disclosure, the user may directly allocate touch recognition blocks in the respective areas. As described above, in the front surface or contact surface 2001 of the protection case according to the embodiment of the present disclosure, the respective areas 2005, 2007, 2009, and 2011 have different dielectric constants, and touch recognition blocks are disposed in the respective areas 2005, 2007, 2009, and 2011, so that different protection cases having an identical combination may have different dielectric constants. Therefore, the electronic device 100 may perform different functions according to dielectric constants, thereby allowing the electronic device 100 to perform various functions.

Various embodiments of the present disclosure and all functional operations described in this specification may be implemented in computer software, firmware, or hardware, including the structures disclosed in this specification and their structural equivalents, or in any combination thereof. Various embodiments of the subject matter described in this specification may be implemented as one or more computer program products such as, for example, one or more modules of computer program instructions encoded on a non-transitory computer readable medium for execution by, or to control the operation of, data processing apparatus.

The non-transitory computer-readable medium may be a machine-readable storage device, a machine-readable storage substrate, a memory device, a composition of matter affecting a machine-readable propagated signal, or any combination thereof. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any combination thereof).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an electronic device including an openable cover, the method comprising:
   detecting at least one conductive material attached to the openable cover, wherein the at least one conductive material is arranged randomly in the openable cover;
   identifying an arrangement of the at least one conductive material arranged in the openable cover based on a location of the detected at least one conductive material;
   displaying a list including at least one operational function to be mapped to the identified arrangement;
   mapping the arrangement of the at least one conductive material arranged in the openable cover to an operational function of the electronic device;
   storing a mapping result;
   in response to detecting that the openable cover is contacted with a display screen of the electronic device, determining an arrangement of at least one conductive material arranged in the contacted openable cover;
   determining an operational function corresponding to the determined arrangement among the stored operational functions; and
   performing the determined operational function.

2. The method of claim 1, wherein the performing of the operational function of the electronic device comprises displaying at least one of an image and data generated during performance of the function.

3. The method of claim 1, wherein the identifying of the combination of the detected at least one conductive material comprises:
   identifying the combination in which the conductive materials are arranged based on coordinates at which the at least one conductive material is detected.

4. The method of claim 1, further comprising:
   detecting respective dielectric constants of the at least one conductive materials; and
   determining the operational function mapped to the combination of the at least one conductive material according to the detected dielectric constants.

5. The method of claim 1, further comprising:
   determining whether a location at which the at least one conductive material is detected is outside a predetermined touch recognition tolerance; and
   determining that the at least one conductive material is detected when the location at which the at least one conductive material is detected is not outside the predetermined touch recognition tolerance.

6. The method of claim 1, wherein the detecting of the at least one conductive material comprises:
   detecting the at least one conductive material based on predetermined touch recognition minimum and maximum sizes.

7. An electronic device including an openable cover, the electronic device comprising:
   at least one processor;
   a touch sensitive display;
   a memory; and
   at least one program stored in the memory and configured to be executable by the at least one processor,
   wherein the program includes instructions for:
      detecting at least one conductive material attached to the openable cover, wherein the at least one conductive material is arranged randomly in the openable cover;
      identifying an arrangement of the at least one conductive material arranged in the openable cover based on a location of the detected at least one conductive material;
      displaying a list including at least one operational function to be mapped to the identified arrangement;
      mapping the arrangement of the at least one conductive material to an operational function of the electronic device;
      storing a mapping result;
      in response to detecting that the openable cover is contacted with a display screen of the electronic device, determining an arrangement of at least one conductive material arranged in the contacted openable cover;
      determining an operational function corresponding to the determined arrangement among the stored operational functions; and
      performing the determined operational function.

8. The electronic device of claim 7, wherein the program includes an instruction for, when the identified combination is matched with a pre-stored combination, performing a function mapped to the pre-stored combination and for displaying at least one of an image and data generated during performance of the function.

9. The electronic device of claim 7, wherein the program includes an instruction for detecting respective dielectric constants of the at least one conductive material and for determining the operational function mapped to the combination of the at least one conductive material according to the detected dielectric constants.

10. The electronic device of claim 7, wherein the program includes an instruction for determining whether a location at which the at least one conductive material is detected is outside a predetermined touch recognition tolerance, and for determining that the at least one conductive material is detected when the location at which the at least one conductive material is detected is not outside the predetermined touch recognition tolerance.

11. The electronic device of claim 7, wherein the program includes an instruction for detecting the at least one conductive material based on predetermined touch recognition minimum and maximum sizes.

12. A protection case comprising:
   a first surface including at least one first conductive material, and configured to come into contact with a display panel of an electronic device; and
   a second conductive material connected to the first conductive material, and having a dielectric constant equal to or greater than a threshold value,
   wherein the at least one first conductive material is arranged randomly in the first surface, and
   wherein the at least one first conductive material is contacted with the display panel of an electronic device to cause the electronic device to display a list including at least one operational function to be mapped to an arrangement of the at least one first conductive material, in response to closing of the protection case.

13. The protection case of claim 12, wherein the first surface includes a window for providing a graphic and interface displayed on the display panel of the electronic device to a user when the protection case is in a closed state in relation to the electronic device.

14. The protection case of claim 12, wherein the second conductive material is disposed in at least one of the first surface and a second surface of the protection case, and
wherein the second surface comes into contact with a rear surface of the electronic device.

15. The protection case of claim 12, wherein the at least one first conductive material is a plurality of conductive materials having different dielectric constants.

16. The protection case of claim 12, wherein the threshold value is a minimum dielectric constant at which the electronic device recognizes the contact as a touch, and when the at least one first conductive material comes into contact with a display screen of the electronic device, the dielectric constant of the second conductive material is equal to or greater than the threshold value.

17. The protection case of claim 12, wherein the second conductive material is connected to the at least one first conductive material through one or more conductive connection lines.

18. The protection case of claim 12, wherein the at least one first conductive materials is connected directly to the second conductive material to form a protrusion of the second conductive material.

19. The protection case of claim 12, wherein the first surface is formed by connecting the second conductive material including a protrusion of the first conductive material to non-conductive material including a hole at a location corresponding to a location of the protrusion.

* * * * *